United States Patent [19]
Gerard

[11] 3,805,267
[45] Apr. 16, 1974

[54] AIRBORNE TELEMETERING RADAR
[75] Inventor: Collot Gerard, Saint-Germain En Laye, France
[73] Assignee: Electronique Marcel Dassault, Paris, France
[22] Filed: June 6, 1972
[21] Appl. No.: 260,178

[30] Foreign Application Priority Data
June 8, 1971  France .............................. 71.20757

[52] U.S. Cl. .................................. 343/7.3, 343/7 A
[51] Int. Cl. ............................................. G01s 9/16
[58] Field of Search .................. 343/7.3, 5 GC, 7 A

[56] References Cited
UNITED STATES PATENTS
3,478,355  11/1969  Lundgreen et al .................... 343/7.3

Primary Examiner—Malcolm Hubler
Attorney, Agent, or Firm—Stevens, Davis, Miller & Mosher

[57] ABSTRACT

The present invention relates to an aircraft radar receiver for search and for tracking a target through one or more telemetry windows which, in the search phase, carry out distance scanning and which, on receiving a target echo, locks onto the same in order to supply telemetric information, said receiver comprising means for, during the search phase, desensitizing the radar receiver for the distance which corresponds to the altitude of the aircraft above the ground so that the altitude return signal does not cause the radar to switch to tracking state, wherein the desensitization means are inoperative when the altitude return signal occurs in the radar tracking state.

5 Claims, 6 Drawing Figures

AIRBORNE TELEMETERING RADAR

The present invention concerns airborne telemetering or distance measuring radars for aircrafts.

It relates to radars in which the telemetric phase is preceded by a search phase during which the radar explores the space ahead of the aircraft from a relatively short distance to a greater distance.

This search or exploration phase gives rise to certain difficulties when the aircraft is flying at low altitude, since the echos from the ground may cause confusion with echos from a target.

The risk of confusion is sufficiently great for it to be admitted, in general, that during low altitude flight, such radar can supply valid information only for targets the distance of which is less than the altitude of the aircraft, this being due to the presence of the so called "altitude return signal," caused by the reflection of the radar pulses on the ground (or sea) at right angles to the aircraft, which is inevitable despite the care taken in the construction of radar antennae and which may be of a relatively high intensity in the case of certain ground types and configurations.

A system was proposed whereby information obtained from an altitude measuring apparatus neutralized radar information in a distance range centered on the altitude of the aircraft, but range neutralised has to be so broad that the efficiency of the radar is thereby considerably reduced.

In the device according to the invention, the distance range within which the radar is nonoperational is considerably restricted by the fact that neutralization occurs as a very function of the amplitude of the altitude return signal.

According to one form of embodiment, the altitude return signal causes desensitization of the radar, the desensitization decreasing immediately on departure, during exploration, from the distance corresponding to the altitude.

The invention, in this respect, provides that this desensitization is maximum for the distance corresponding to the altitude, so that the altitude return signal does not cause the radar to switch to tracking condition whatever the form of the return signal, and decreases according at a sufficiently rapid rate for an echo from a target at a distance differing little from that of the altitude to cause the radar to switch to tracking state.

The invention makes here use of echo amplitude variation laws as a function of distance alone according to whether the echo comes from a target or an altitude return signal.

In the following description, given for purposes of illustration, reference will be made to the attached drawings in which:

FIG. 1 schematically represents the radiation diagram of an airborne radar;

Figure 1:
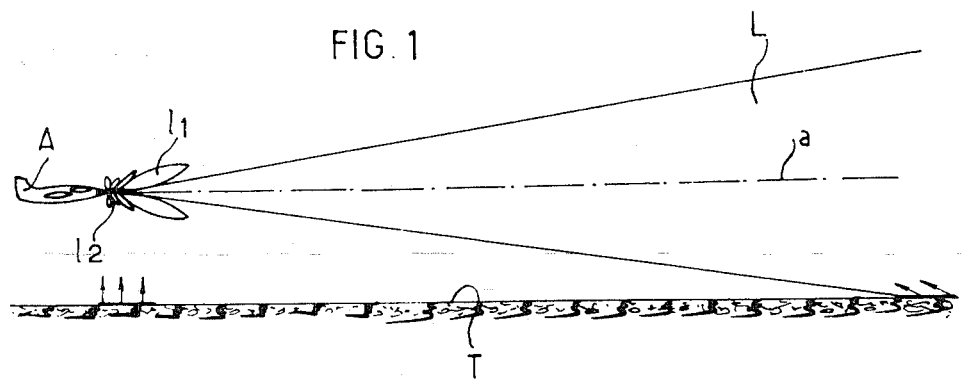

For an aircraft A fitted with a telemetry radar suitable for searching or tracking, that is to say with one or more telemetry windows shifting from a minimum or theoretical distance O to a maximum distance corresponding to the radar range, and then again from the minimum distance to the maximum distance, etc., until the window or windows lock on a target echo whereupon they give the distance at any moment from the target, radar emission takes place, not only in main lobe L (FIG. 1) but also in secondary lobes $l_1$ at an angle to the longitudinal axis $a$ of the aircraft, and also in the more diffuse lobes $l_2$ which are more nearly perpendicular to the axis $a$.

Figure 2:
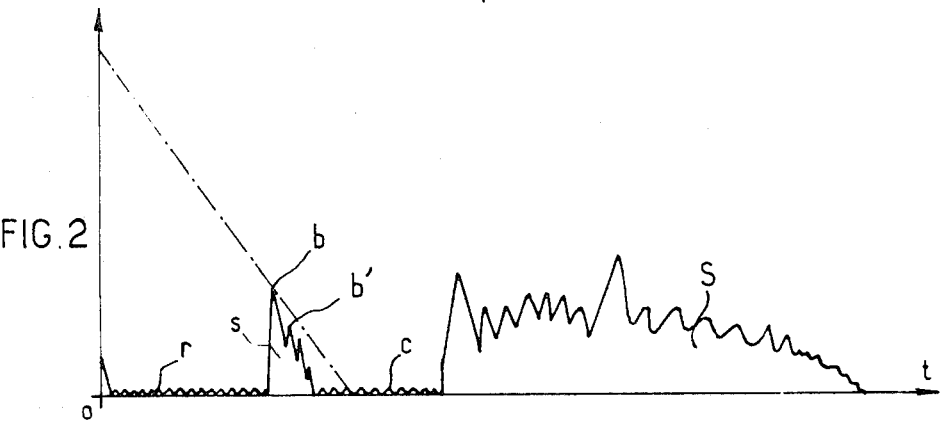
FIG. 2 represents the amplitude variations of the return radar signal as a function of time during a low altitude search.

FIG. 2 represents, as a time function, the amplitude variations of the reception radar signal of aircraft A flying at low altitude above ground T during a search phase from distance O at which the emission pulse is visible: the ground straight below aircraft A gives an "altitude return" signal $s$ which may assume various forms depending on the nature of the ground straight below the apparatus.

In the case in point, the quality of the antenna is sufficient for the secondary lobes $l_1$ to give little or no echo.

The "ground echo" S is that corresponding to the intersection of the ground and the beam of main lobe L.

In the majority of pulse type radars, for search and/or telemetry, now used, means are provided for ensuring that a target is locked onto, when the aircraft is flying at a low altitude, only if its distance from the aircraft is less than the altitude, this being in order to prevent confusing a target echo with the altitude return signal.

In the radar device according to the invention, on the contrary, means are provided to ensure that the radar locks onto a target echo even in the case of a target the distance of which from the aircraft is greater than the altitude without there being, however, a risk of confusing it with altitude return signals.

Figure 4:
FIG. 4 represents a gating signal used in this invention.

For this purpose, a return radar signal is transmitted through a line 11 to an intermediate frequency (I.F.) amplifier 12 comprising a gain control device 13; the output of a detector 12' fitted to the amplifier and transmitting the video frequency is divided into two arms: a first arm 15 and a second arm 16. The first arm 15 transmits the video frequency to a peak detector 17 comprising a gate 18, opened and closed by a signal as shown on FIG. 4, applied through a line 19 and emitted by a pulse generator 20 giving a pulse of predetermined width, the position of which corresponds to the altitude at which the aircraft is flying as communicated to generator 20 through an input 23 connected to a radio altimeter.

Figure 5:
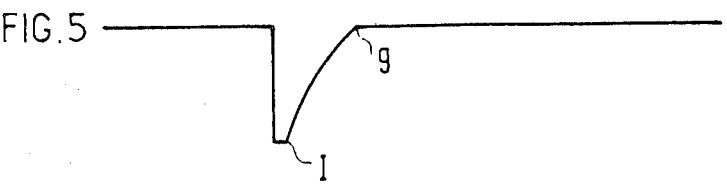
FIG. 5 represents the output of a voltage generator as a function of detected altitude.

The peak detector 17 is connected by a line 24 to a voltage generator device 25 having a voltage output appearing on its output line 26 which, from a value corresponding to that of the peak amplitude applied to its input, decreases to nil, as shown in FIG. 5.

Line 26 ends in a two position switch 27 as represented by solid line 28 and broken line 29.

In the first position, line 26 is connected by the switch 27 to a line 30 connected to gain control device 13 of intermediate frequency amplifier 12.

The second channel 16 of the video frequency output 14 ends in an arm 31 having a gain control device 32, the output 33 of which is connected to line 30 when switch 27 is in the other position represented by broken line 29.

Switch 27 is set to one or the other position as a function of the output 34 of a switching control device 35 connected by a line 36 to the device 22 which causes the radar to go from search state to distance tracking state and vice versa.

Operation is as follows:

During the search phase, when the radar periodically searches for targets within a minimum or theoretical zero distance and maximum range, the radar reception pattern is, when there is no target and the aircraft is flying at low altitude, for example represented in FIG. 2, with a first part r corresponding to radar noise, a peak b corresponding to "altitude return," followed by secondary peaks b' corresponding to "diffuse" returns, a part c again corresponding to radar noise alone, in the case of a sufficiently well designed antenna, and a part S corresponding to ground echo, that is to say the portion of ground encountered by the radar beam corresponding to the main lobe of the radar digram.

The form of the reception pattern depends not only on the quality of the antenna and the radome but also on the nature of the ground, the buildings thereon, etc..

Figure 6:
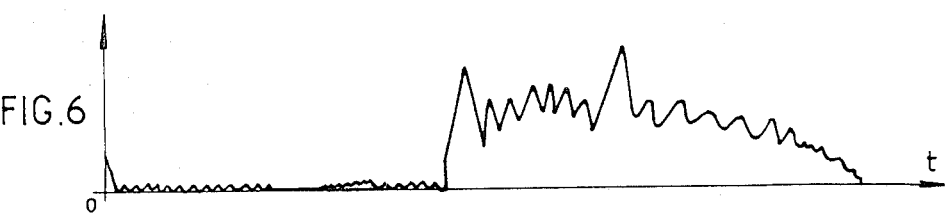
FIG. 6 represents the return radar signal with the altitude detection component removed.
Figure 3:
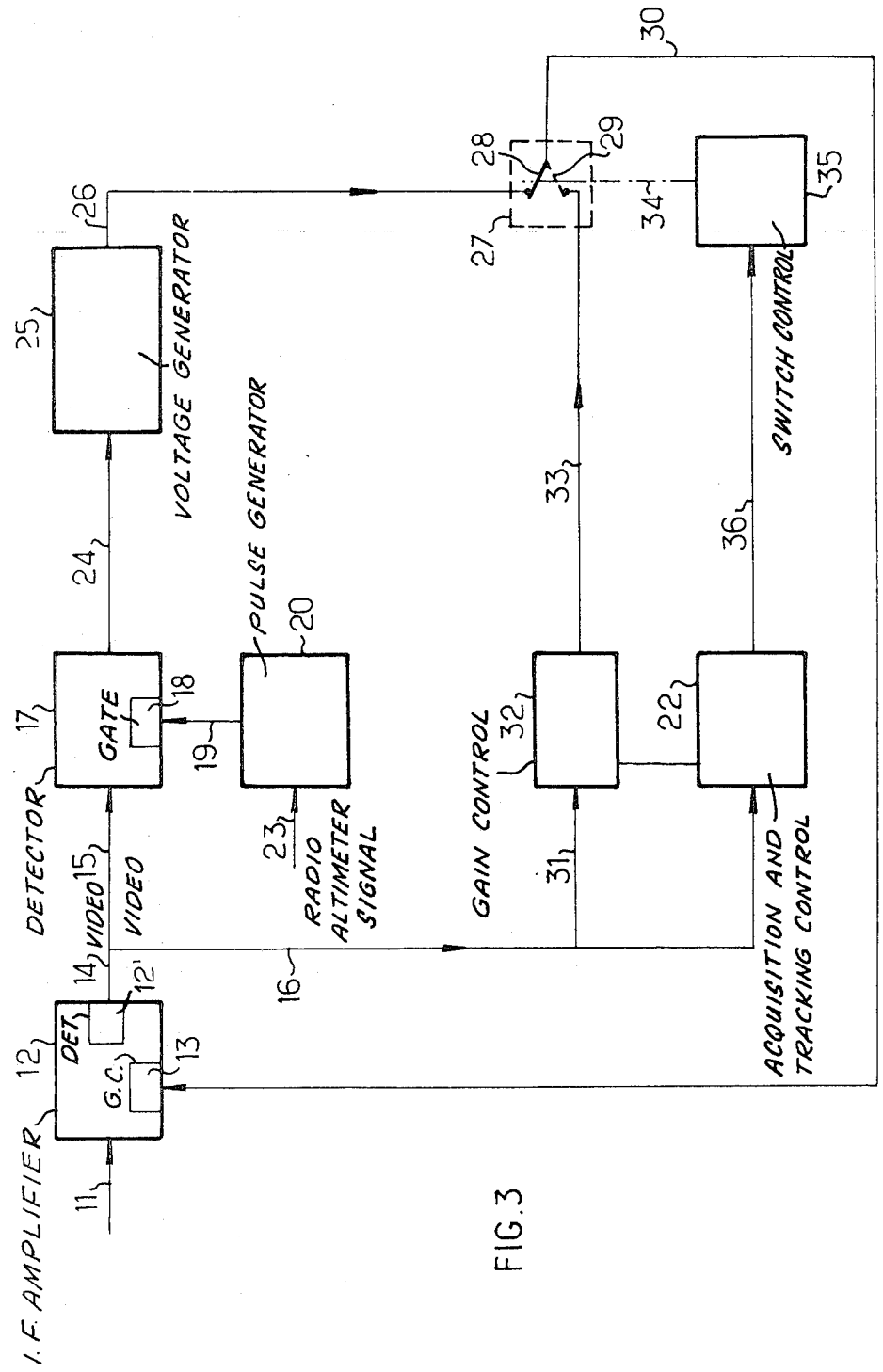
FIG. 3 is a block diagram of an improved radar according to the invention.

When the radar emits a pulse and the aircraft is flying at a sufficiently low altitude for the altitude return signal to cause inconvenience, the altitude return signal passes through the peak detector owing to the simultaneous presence of the pulse transmitted through line 19 to gate 18; the output of pulse generator 25 has the form shown in the FIG. 5, the maximum amplitude of which depends on the peak amplitude applied through input 24. This voltage is applied through line 26, switch 27 being then in the position represented by an unbroken line, and line 30 to the gain control device 13 connected to intermediate frequency amplifier 12. It desensitizes the radar receiver by causing the amplification rate of amplifier 12 to vary according to the form of the desensitizing signal emitted by device 25, first making amplifier 12 nonoperational for the maximum amplitude of the desensitization voltage, the amplifier again becoming increasingly operative as a function of the law governing the desensitization voltage until amplification is completely restored when said voltage disappears as shown in FIG. 6. In other words, voltage generator 25 produces a negative feedback signal to block the output of amplifier 12 when the altitude indicating return signal appears.

Consequently, at the moment when the altitude return signal appears, the radar receiver is completely desensitized and no voltage is applied to input 36 of device 22 causing the radar to switch from search to tracking state, so that the altitude return signal leaves the radar receiver in search state and does not cause it to switch to tracking state.

In the case of a target echo, however, the appearance of which is not simultaneous with that of the altitude return signal, gate 18 disconnects video frequency output 14 from device 25, so that no desensitizing voltage is generated. Amplifier 12 functions and the video frequency voltage corresponding to the target echo is applied through line 16 to search and tracking state control device 22; the telemetry window or windows lock onto the target echo, the radar being in tracking state.

Simultaneously, the instruction signal emitted by device 22 is applied through line 36 to control device 35 and switch 27 is brought from the position indicated by an unbroken line at 28 to that represented by broken line 29; gain control device 32 becomes operational and, through a circuit comprising output 14, arm 16, input 31, gain control device 32, line 33, switch 27 and line 30, gain control device 13 coupled to amplifier 12 maintains the amplification rate at the level most suitable for tracking.

If, during tracking, the target comes to be at a distance from the aircraft exactly equal to the altitude of the latter above the ground, although the radio-altimeter causes generator 20 to transmit a pulse to gate 18 which connects up amplifier 12 and device 25 at the precise moment when the target echo is present at output 14 of amplifier 12, no desensitizing voltage is applied to amplifier 12, the transmission circuit being open at switch 27 which is then in the position represented by the broken line. The radar does not thus interrupt target tracking even when the target is at exactly the distance corresponding to the altitude of the aircraft.

The radar is thus capable of ensuring that the target is tracked whether the latter is at a distance shorter than or greater than the altitude and without the target being lost at the moment when it is at a distance from the aircraft that is equal to the altitude of the latter.

Since the maximum amplitude of the desensitizing voltage is linked to the peak amplitude of the altitude return signal as supplied by detector 17, the radar is sensitive for targets the distance of which is very near to the altitude, the installation is adapted to the various ground conditions and the distance within which the radar is not operative for searching for a target is limited as much as possible.

Indeed, owing to variations that constantly occur, either in the relative position of the target and the aircraft, or in the intensity of the altitude return signal, the radar may lock onto a target, whatever its distance from the aircraft, even when the distance corresponds to or approximates the altitude of the aircraft.

The invention provides for device 25 to emit a signal ensuring the desensitization of the amplifier which varies from maximum desensitization as a function of a law very rapidly ensuring sufficient resensitization for reception of an echo from a target appearing at a distance differing very little from the altitude to be amplified sufficiently to enable device 22 to function and the radar to switch to tracking state on said target. The desensitization law may thus be linked with the target reception law $R^{-4}$.

The invention provides for means informing the pilot that the target on which the radar is homing is located at a distance approximating to the altitude of the aircraft.

The improvement according to the invention obviates the disadvantages of conventional search and telemetry radars whose operation is ensured only for determining a target within a relatively narrow distance range and, in the case of low altitude flying, for distances less than the altitude of the aircraft.

I claim:

1. An airborne target acquisition and tracking radar receiver carried by an aircraft for discriminating between target acquisition signals and the altitude of said aircraft detected by the radar signals, comprising:

an intermediate frequency amplifier, to the input of which return radar signals are applied;
gain control means coupled to said amplifier to control the gain of said return signals;
pulse generating means for generating a pulse signal corresponding to the altitude of said aircraft;
a video signal peak detector having a first input coupled to the output of said amplifier;
gate means coupled between the output of said pulse generating means and a second input of said peak detector;
voltage generating means coupled to the output of said peak detector for generating a shaped voltage which is a function of the video signal detected by said peak detector; and
means selectively coupling the output of said shaped voltage generating means to said gain control means to reduce the amplitude of said return signal amplified by said amplifier, whereby the acquisition and tracking of a target signal take place and are continued independently of the value of the ratio of the aircraft altitude and the distance between the target and the radar receiver.

2. An airborne radar receiver according to claim 1, further comprising means for controlling the radar receiver operation mode as to acquisition of a target and tracking thereof, and switch means connected to said operation mode control means for selectively applying the output of said voltage generator to said gain control means.

3. An airborne receiver according to claim 2, further comprising a further gain control device whose input is connected to the output of said intermediate frequency amplifier and whose output is selectively connected to said amplifier gain control means through said switch means.

4. An airborne receiver according to claim 3, wherein said gain control device is rendered operative for controlling said I.F. amplifier during the tracking operative mode of the radar receiver.

5. An airborne radar receiver according to claim 1, wherein the shaped voltage signal is a time function decreasing signal decreasing more rapidly than a $R^{-4}$ law, R being the radar distance.

* * * * *